United States Patent [19]

Aichinger et al.

[11] 4,104,524

[45] Aug. 1, 1978

[54] CIRCUIT ARRANGEMENT FOR A DETECTOR FOR IONIZING RADIATION

[75] Inventors: Horst Aichinger, Fuerth; Heinz-Erik Kranberg; Karlheinz Koehler, both of Erlangen, all of Germany

[73] Assignee: Siemens Aktiengesellschaft, Berlin & Munich, Germany

[21] Appl. No.: 771,847

[22] Filed: Feb. 25, 1977

[30] Foreign Application Priority Data

Mar. 15, 1976 [DE] Fed. Rep. of Germany ....... 2610845

[51] Int. Cl.[2] .............................................. G03B 41/16

[52] U.S. Cl. .................................... 250/402; 250/409; 250/413

[58] Field of Search ............... 250/401, 402, 408, 409, 250/413

[56] References Cited

U.S. PATENT DOCUMENTS 3,586,860 6/1971 Husbuarna ........................... 250/409

*Primary Examiner*—Craig E. Church

*Attorney, Agent, or Firm*—Hill, Gross, Simpson, Van Santen, Steadman, Chiara & Simpson

[57] ABSTRACT

In an illustrated embodiment, a detector having a plurality of measuring fields is provided with a computer circuit for the formation of a difference signal which corresponds to the difference between the greatest and the smallest output signal of the measuring fields, a computer circuit for the formation of a sum signal which corresponds to the sum of the greatest and the smallest output signal of the measuring fields, and a division circuit is connected to provide an output as a function of the difference signal divided by the sum signal, as a measure of contrast over the selected measurement surface. The contrast signal can be utilized to control the duration of an exposure. Further, the contrast signal can be used for an automatic adjustment of the x-ray tube high voltage during an exposure so as to achieve an optimum picture contrast.

4 Claims, 2 Drawing Figures

CIRCUIT ARRANGEMENT FOR A DETECTOR FOR IONIZING RADIATION

CROSS-REFERENCE TO RELATED APPLICATION

The present application relates to an improvement over our copending application Ser. No. 742,664 filed Nov. 17, 1976, and having the same title as the present application.

BACKGROUND OF THE INVENTION

The invention relates to a circuit arrangement for a detector for ionizing radiation exhibiting a plurality of measuring fields, in which means for processing the output signals are connected to the output side of each measuring field.

Circuit arrangements of this type are employed in automatic x-ray exposure timers. In such instances, each measuring field delivers a signal which is a measure of the corresponding dose rate of the radiation impinging thereon. By integrating this signal, it is possible to obtain a signal corresponding to the x-ray dose, and to use this signal in order to switch off the radiation.

On the basis of the varying transparency of medical subjects it is necessary, in an automatic radiographic exposure timer of the type described, to ascertain the mean value of the dose over a greater area which is important for the diagnosis. This may proceed through a suitable selection of the radiation-sensitive measuring surface of the detector. Specifically, the radiation-sensitive measuring surface can be determined by a suitable switching on of measuring fields. However, during examinations with contrast agents, for example during the examination of the stomach-intestine passage, it is possible for a greater area of the measuring surface to be covered by the contrast agent, which leads to incorrect exposures by the automatic exposure timer because, in this instance, the radiation dose which is integrated over the measuring surface of the detector in a specific period of time can be greatly divergent from the dose which results when such strong contrasts in the X-ray image are not present.

SUMMARY OF THE INVENTION

The object which is the basis of the invention consists in producing a circuit arrangement for a detector of the type initially cited which permits a detection of the contrast in the x-ray image, thereby making it possible to eliminate incorrect exposures of an x-ray film or the like.

In accordance with the invention, this problem is solved by a computer circuit for the formation of a different signal corresponding to the difference between the greatest and the smallest output signal of the measuring fields, a computer circuit for the formation of a sum signal corresponding to the sum of the greatest and the smallest output signal of the measuring fields, and a division circuit for forming the quotient of the difference signal and the sum signal. The output signal of the division circuit is proportional to the dose-contrast in the area of the measuring surface. In the case of photographs with contrast agents, for example, it is with this signal that the amplification of the automatic exposure timer can be changed during the photograph in order to prevent incorrect exposures. In addition, the contrast signal can be used for the purpose of an automatic adjustment of the x-ray tube high voltage during an exposure; that is, the x-ray tube high voltage can be adjusted with the aim of obtaining an optimum image contrast.

Other objects, features and advantages of the present invention will be apparent from the following detailed description of an illustrative embodiment, shown by way of example and not of limitation.

DETAILED DESCRIPTION

Figure 1:
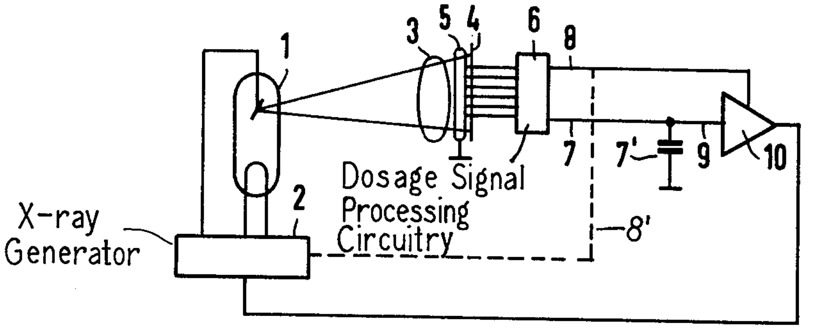
FIG. 1 is a block circuit diagram illustrating an overall system in accordance with the concepts and teachings of the present invention.

FIG. 1 illustrates an x-ray tube 1 which is supplied by an x-ray generator 2 and which irradiates a patient 3 in order to produce an x-ray photograph on an x-ray film 4. In order to automatically control the exposure time, there is provided an automatic x-ray exposure timer with a detector 5 which in the exemplary illustrated embodiment has six measuring fields which can be selectively switched on in order to form the measuring surface. Each of the individual measuring fields of detector 5 is connected with dosage signal processing circuitry 6. If the detector is shadow-free, it can be placed in front of film 4; if not, the detector must be arranged behind the film. The circuit arrangement 6 has an output 7 on which there is a signal corresponding to the mean dose rate of the selected measuring surface, and an output 8 on which there is a signal indicating the dose-contrast of the selected measuring surface.

The signal on output 7 is indicated as being integrated by means of a capacitance 7' so that a signal is provided at input 9 of an amplifier 10 which corresponds to the mean dose of the selected measuring surface. The amplification of amplifier 10 is influenced by the signal on output 8. The output signal of amplifier 10 is utilized to control conventional comparator circuitry or the like within x-ray generator 2 such that, when the voltage on capacitor 7' reaches a predetermined value corresponding to a predetermined mean dose of the selected measuring surface, the x-ray tube 1 is switched off. Broken line 8' indicates that, by means of the contrast signal on output 8, the x-ray tube high voltage supplied by x-ray generator 2 can also be adjusted.

Figure 2:
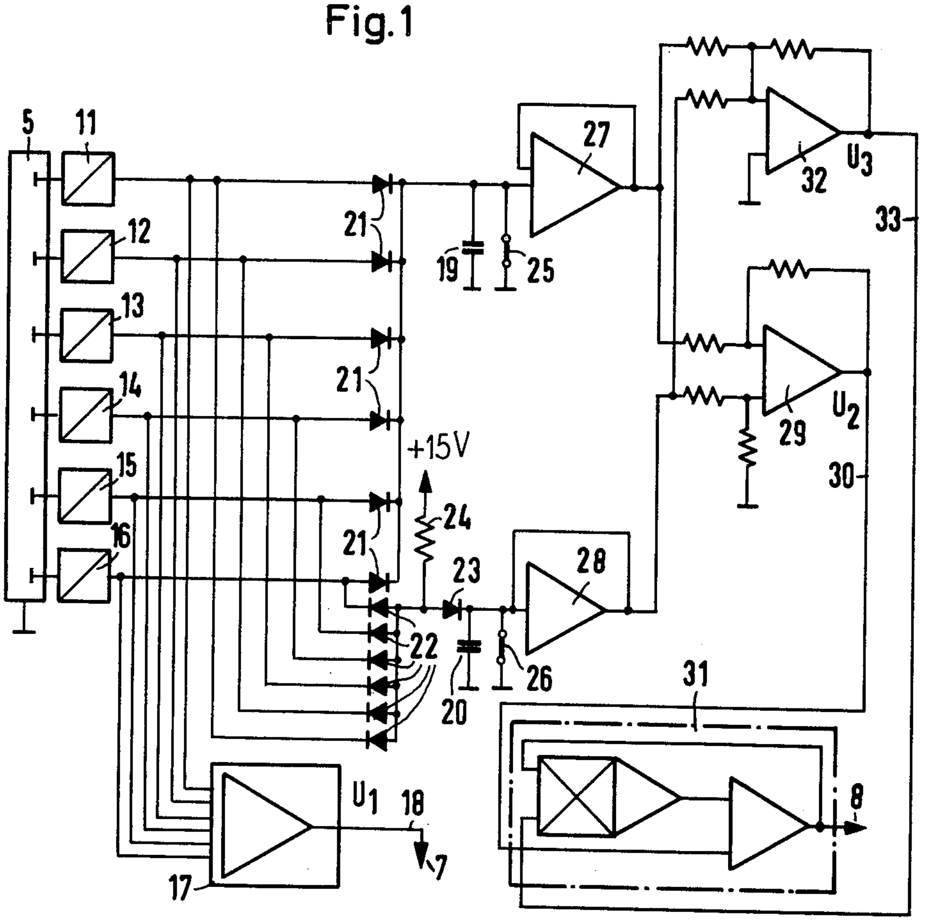
FIG. 2 shows a circuit arrangement for implementing the dosage signal processing circuitry of the system of FIG. 1.

FIG. 2 is a precise illustration of the circuit arrangement 6. Radiation detector 5 is a semiconductor detector in which, in the illustrated embodiment, all six measuring fields are switched on. The output signals of the six measuring fields are fed to six current-voltage converters 11 through 16. The output signals from the measuring fields are proportional to the dose rate in the respective measuring field. The current-voltage converters 11 through 16 supply output signals to a sum-forming circuit 17 which supplies an output which is a function of the sum or total of the signals from the converters 11–16. Accordingly, the signal $U_1$ at output 18 of the summing circuit 17 is proportional to the mean dose rate in the measuring surface of radiation detector 5. As described, this output signal serves the purpose of providing a measure of the dose rate which is fed to the integrating capacitance 7' of FIG. 1 via line 7.

The output signals of the current-voltage converters 11 through 16 are additionally supplied to two peak value memories which are formed from two capacitors 19 and 20. Capacitor 19 is associated with a matrix consisting of diodes 21 wherein the diodes are poled in such a manner that a signal is stored in capacitor 19 during a photographic exposure which corresponds to the maximum dose rate in the selected measuring field; that is, which corresponds to the highest output voltage of the current-voltage converters. A diode matrix comprising diodes 22, a diode 23 and a resistance 24 are coupled with capacitor 20 whereby because of the opposite polarity of diodes 22 and 23 relative to the potential supplied to their junction point via resistance 24, the voltage on capacitor 20 is proportional to the minimum dose rate in the selected measuring surface; that is proportional to the smallest output signal of the current-voltage converters 11 through 16. Capacitors 19 and 20 are normally short-circuited by relay contacts 25 and 26. With the commencement of an x-ray photograph, contacts 25 and 26 are opened so that a signal corresponding to the maximum or minimum dose rate, respectively, is stored only during an x-ray photographing operation.

The signal corresponding to the maximum dose rate is supplied to an operational amplifier 27, and the signal corresponding to the minimum dose rate is supplied to an operational amplifier 28. The output signals of operational amplifiers 27 and 28 are subtracted from one another in a differential amplifier 29, so a voltage $U_2$ representing a difference signal is supplied to output 30 of differential amplifier 29, said voltage $U_2$ corresponding to the difference between the maximum and the minimum dose rate of the selected measuring surface. This signal is supplied to a division circuit 31. The output signals of operational amplifiers 27 and 28 are further added in a summing amplifier 32, so that the output voltage $U_3$ at output 33 of the summing amplifier 32 correspond to the sum of the maximum and the minimum dose rate of the selected measuring surface. Voltage $U_3$ is also supplied to division circuit 31. Division circuit 31 forms the quotient $U = U_2/U_3$; that is the quotient which is formed from a voltage corresponding to the difference between the maximum and the minimum dose rate in the selected measuring surface and a voltage corresponding to the sum of the maximum and the minimum dose rate in the selected measuring surface. Accordingly, voltage U is proportional to the contrast of the x-ray image. This voltage U can be employed in the manner described for the purpose of controlling the amplification of amplifier 10, in order to obtain a satisfactory photographic density or darkening even when there are great image contrasts. In addition, this voltage U, as mentioned, may be used for influencing x-ray tube high voltage.

Radiation detector 5 may be a semiconductor detector. However, a radiation measurement chamber (ionizing chamber) with sub-divided measuring fields is also suitable.

Supplementary Discussion

For the sake of a specific example, reference may be made to the copending application Ser. No. 742,664 filed Nov. 17, 1976, the third figure, for specific circuitry suitable for controlling the x-ray tube high voltage by means of the contrast signal at conductors 8 and 8' of FIG. 1. Such third figure also illustrates an exemplary automatic exposure timer which may have its input connected to the conductor 7 and which may include an integrating operational amplifier corresponding to capacitance 7' and a voltage controlled amplifier circuit corresponding to amplifier 10 of FIG. 1 whose amplification is controlled by the contrast signal at conductor 8 of FIGS. 1 and 2 hereof. The circuitry of such third figure and its description are incorporated herein by reference. The outputs of conductors 7 and 8' may be utilized to provide a dose rate actual value signal (from conductor 7) and to adjust the dosage rate nominal value (by supplying conductor 8' to the gain control input of an analog amplifier with voltage-controlled gain, the output of the amplifier thus supplying an adjusted dose rate nominal value signal) which may be supplied to an x-ray high voltage regulating installation such as shown in U.S. Pat. No. 3,978,339.

While an exemplary embodiment of the invention has been given, and presently preferred circuitry for implementing component 6 of FIG. 1 has been shown in detail, it will be apparent that many modifications and variations may be effected without departing from the scope of the novel concepts of the present invention.

We claim as our invention:

1. An apparatus for producing an ionizing radiation image, having a detector for ionizing radiation with at least three measurement fields and operable for supplying respective output signals as a function of the radiation impinging on the respective fields thereof, a computer circuit for forming a difference signal which corresponds to the difference between the greatest and the smallest output signals of the measuring fields, a computer circuit for forming a sum signal which corresponds to the sum of the greatest and the smallest output signals of the measuring fields, and a division circuit for supplying a quotient signal corresponding to the difference signal divided by the sum signal, as a measure of dosage contrast over the region of the measurement fields of the image, and means for adjusting said contrast.

2. An apparatus according to claim 1, with automatic radiographic exposure means operatively connected with at least one of said fields and comprising signal amplifier means having a signal input for receiving an input signal in accordance with ionizing radiation impinging on said detector and having a control input for controlling the amplification of said amplifier means, said division circuit being operatively connected with said control input of said signal amplifier means for controlling the amplification thereof and thereby operatively varying the duration of an exposure as a function of the output from said division circuit.

3. An apparatus according to claim 1 with control means for controlling an x-ray tube high voltage, and said division circuit having its output connected with said control circuit for adjusting the x-ray tube high voltage in accordance with the output from said division circuit.

4. In a circuit arrangement including a detector for ionizing radiation with at least three measurement fields and operable for supplying respective output signals as a function of the radiation impinging on the respective fields thereof, a computer circuit for forming a difference signal which corresponds to the difference between the greatest and the smallest output signals of the measuring fields, a computer circuit for forming a sum signal which corresponds to the sum of the greatest and the smallest output signals of the measuring fields, and a division circuit for supplying a quotient signal corresponding to the difference signal divided by the sum signal, as a measure of dosage contrast over the region of the measurement fields, and automatic radiographic exposure means operatively connected with at least one of said fields and comprising signal amplifier means having a signal input for receiving an input signal in accordance with ionizing radiation impinging on said detector and having a control input for controlling the amplification of said amplifier means, said division circuit being operatively connected with said control input of said signal amplifier means for controlling the amplification thereof and thereby operatively varying the duration of an exposure as a function of the output from said division circuit.

* * * * *